Patented Jan. 8, 1952

2,582,098

UNITED STATES PATENT OFFICE 2,582,098

PHENOL-ALDEHYDE-AMINE ANION EXCHANGE RESIN

David G. Braithwaite and Joseph S. D'Amico, Chicago, Ill., assignors to National Aluminate Corporation, Chicago, Ill., a corporation of Delaware No Drawing. Application October 11, 1947, Serial No. 779,406

10 Claims. (Cl. 210—24)

This invention relates to new and improved resinous polymerization products having marked and valuable properties of anion adsorption, absorption, or exchange, and to a new and improved method for the preparation of such products.

The preparation of basic resinous condensation products from formaldehyde and amines is well known, and certain products of this type, more particularly those prepared from aromatic amines, have been used for anion removal from solutions. Most attempts to produce resins with improved basic properties by substituting aliphatic amines for aromatic amines have been unsuccessful heretofore because the aliphatic amine condensation products were soft, water soluble, thermoplastic, lacked physical stability or had other properties which rendered them useless for such purposes as the removal of anions from aqueous solutions.

One of the objects of the present invention is to provide a new and improved type of resinous polymerization product which is particularly suited for anion removal from aqueous solutions.

Another object of the invention is to provide a new and improved type of aliphatic amine-aldehyde resinous condensation product of high molecular weight and with properties superior to resinous anion exchange condensation products heretofore disclosed.

Another object of the invention is to produce new and improved high molecular weight polymers which are capable of removing anions from aqueous solutions, and which are insoluble in aqueous solutions after complete exhaustion due to anion adsorption, absorption, or exchange.

Another object of the invention is to provide new and improved resinous condensation products which are completely stable in acidic aqueous solutions at elevated temperatures.

A still further object of the invention is to provide new and improved resinous condensation products which retain their physical form satisfactorily in the presence of flowing liquids.

Another object of the invention is to provide a new and improved method for producing resinous condensation products of the type described above. Other objects will appear hereinafter.

In accomplishing these objects in accordance with the invention, it has been found that new and improved water insoluble resinous condensation products are obtained by the acidic condensation of an aliphatic water soluble methylolamine polymer with a phenol and an aldehyde, preferably followed by drying of the resultant product.

The preferred procedure involves the following steps: (1) reacting an aliphatic amine containing at least one hydrogen atom attached to at least one nitrogen atom in an aqueous solution containing an excess of formaldehyde over the amount theoretically required to convert the hydrogen atoms of the amino groups to methylol groups, while maintaining a temperature sufficiently low to prevent the formation of a resinous precipitate, preferably below 50 degrees C., thereby producing a solution of an aliphatic methylolamine resinous condensation product; (2) adding phenol to the solution obtained as described in (1), while maintaining a temperature below 50 degrees C.; (3) adding an acid to the reaction product of (2) while maintaining the temperature sufficiently low to prevent solidification of the resultant product, preferably below 70 degrees C.; and (4) solidifying the resultant acidic condensation product to a firm solid mass.

The first step produces a clear viscous solution of a linear polymer. In the second step, the reaction of this polymer from (1) with the excess of formaldehyde from (1) and the phenol will normally produce some curd or precipitate of a stringy nature, indicating that the polymer is still more or less linear. In the third step, the formation of a more complex polymer occurs, apparently with the liberation of formaldehyde. In this step, the addition of the acid causes the curdy precipitate from step (2) to dissolve. By keeping the temperature below about 70 degrees C. during the acid addition, a preliminary condensation of undesirable low molecular weight materials which would give color throw is avoided. If the temperature is allowed to rise to a point where a solid resin forms during the preliminary stages of the acidic condensation, less desirable products of relatively low molecular weight are obtained. Hence, it may be said that the resin is formed in liquid phase, or substantially in liquid phase, prior to solidification. The critical temperature which produces resin solidification is usually between 70 degrees C. and 80 degrees C., and in many cases the resin will solidify around 78 degrees C. The fourth step may be effected by discontinuing the cooling during the third step, just prior to the final addition of acid. The heat of reaction then causes a rise in the temperature of the reaction product, to around 100 degrees C. and the entire reaction mass solidifies to a firm solid in the reaction vessel. At the same time, the mass will shrink slightly and can be dumped from the reaction vessel. This reaction mass can then be ground directly, or, if desired, it may be dried before grinding. However, it is preferable to grind the mass first and then dry it, if further drying is deemed to be desirable. The drying temperature is not critical and temperatures of 15 degrees C. to 150 degrees C. for 1 to 24 hours can be used.

Although monoamines can be used in forming the methylolamine condensation products which are further reacted with a phenol and an aldehyde, the preferred aliphatic amines employed in forming the methylolamine condensation products are aliphatic polyamines, more particularly the alkylene polyamines and especially the polyalkylene polyamines. Examples of suitable alkylene polyamines are ethylene diamine, propylene diamine, butylene diamine, decamethylene diamine and other homologues. Examples of suitable monoamines are dimethylamine, diethylamine, methylamine, ethylamine, isopropylamine and homologues. Examples of suitable polyalkylene polyamines are diethylenetriamine, triethylenetetramine, and tetraethylenepentamine, and the corresponding polypropylenepolyamines. Mixtures of the aliphatic monoamines and aliphatic polyamines may also be employed either as mixed monamines, mixed polyamines, or mixtures of monoamines and polyamines. The preferred amines contain at least one primary amino group. The amines employed for the purpose of the invention should preferably be free from polar groups other than amino groups (e. g., hydroxy, carboxy, and sulfonic acid groups), the best results being obtained by eliminating all polar groups except amino groups.

Although it is preferable to employ phenol as one of the reactants, it is also possible, in the practice of the invention, to employ, in lieu of phenol, substituted phenols, polyphenols, substituted polyphenols, polynuclearphenols or substituted polynuclearphenols or any methylol-forming phenol in chemically equivalent amounts. Specific examples of the various phenols which may be mentioned are resorcinol, catechol, the cresols, alpha naphthol, beta naphthol, phenyl phenol, benzyl phenol, isopropyl phenol, octyl phenol, and cyclohexyl phenol.

The preferred aldehyde for the purpose of the invention is formaldehyde. Other aldehydes which may be employed are, for example, acetaldehyde, and heterocyclic aldehydes, (e. g. furfural).

The acidic condensation may be carried out in the presence of an acid or an acid salt. The pH during the acidic condensation is preferably relatively low (i. e., around pH 1 or pH 2). The preferred acids for the purpose of the invention are sulfuric and hydrochloric acids. Other acids which may be mentioned are orthophosphoric acid and acetic acid, and any acid salts which are capable of producing an acidic solution, preferably one having a relatively low pH.

The relative proportions of the reactants employed in the practice of the invention is subject to variation, but the best results have been obtained by the preparation of products having a relatively low nitrogen content. In the first stage of the reaction, as previously indicated, the amine is condensed to form a methylolamine which may be a dimer, trimer, tetramer, or pentamer, depending upon the particular amine employed as a starting material. Thus, with a lower molecular weight very reactive type of amine, such as ethylenediamine, the condensation product with formaldehyde is more likely to be a tetramer or larger polymer than a dimer. On the other hand, with a higher molecular weight amine, such as tetraethylenepentamine, the condensation product is more likely to be of a lower order than with the lower molecular weight amine. If the proportions are calculated on the basis of the quantity of basic nitrogen present in the amine initially employed to form the methylolamine, it is preferable to employ 0.7 to 1.7 atoms of basic nitrogen per 1.5 to 3.0 mols of aldehyde (—CHO) groups per 1 mol of phenol residue ($C_6H_5OH$). If the proportions are calculated on the basis of the amine originally used, the relative molar ratio of the amine to aldehyde to phenol can vary widely depending on the number of nitrogen atoms in the amine.

The amount of nitrogen present in the resultant products may be varied somewhat, depending upon the results desired, but the minimum nitrogen content should preferably be such that the products have an anion exchange capacity of at least 10,000 and the maximum nitrogen content should be less than that which will produce substantial water solubility and color throw in the resultant products. Especially good results have been obtained with products having a nitrogen content of 9 to 14% by weight, a capacity of 15,000 to 20,000, and a physical stability such that they will withstand use in hot liquids at temperatures of 150 degrees F. The preferred products will not exhibit substantial leaching when boiled 15 minutes in a 1–2% hydrochloric acid solution. An acid extract from these products, when neutralized with an alkali, will not show substantial color formation. On the other hand, if the products are unstable they will be dissolved and the color formation will be very pronounced. The product should also be capable of withstanding a friability test made by placing the product to be tested in an oil sample bottle and turning the bottle end over end to determine whether the grains or granules of the product break down. The non-friable product, which will pass a 15 mesh screen and be caught on a 50 mesh screen, should be able to stand this test for 48 to 72 hours. The stability of the products can also be tested by using a "Phototester" of the type described in an article by F. K. Lindsay and R. G. Bielenberg in Industrial and Engineering Chemistry, volume 12, pages 460 to 463 (1940). This latter test is based upon the measurement of light transmission through a liquid and can be employed to test the color throw of the anion exchange material. If there is no substantial color throw, the transmission reading on the "Phototester" will exceed 95%.

The invention will be further illustrated, but is not limited, by the following examples, in which the quantities are stated in parts by weight unless otherwise indicated.

*Example I*

The resinous condensation product obtained by reacting 189 parts of tetraethylenepentamine with 324 parts of 37% by weight aqueous formaldehyde solution was dissolved into 324 parts of 37% by weight aqueous formaldehyde solution and allowed to stand until a clear solution was obtained. To this was then added 386 parts of phenol. The resulting mixture was allowed to react for fifteen minutes, and then 912 parts of 61.6% by weight sulfuric acid solution was added at such a rate that the temperature did not exceed 50 degrees C. A clear, amber, viscous solution was obtained at this point, which, upon further standing and reacting, polymerized to a hard solid. During the final polymerization, the temperature rose to approximately 100 degrees C.

This product was crushed and dried for four hours at 70 degrees C., screened 20/60 mesh, washed with water until the effluent was near neutral, then treated with 4% sodium carbonate, and washed free of excess carbonate. The resulting product had good physical properties and its capacity was 19,800 grains (in terms of $CaCO_3$) per cubic foot. This product was also insoluble in water, benzene, actone, alcohol and carbon tetrachloride.

*Example II*

The resin obtained by reacting 94 parts of tetraethylenepentamine with 150 parts of 37% by weight aqueous formaldehyde solution was redissolved with 100 parts of 37% by weight aqueous formaldehyde solution, 176 parts of phenol was added, and to the resulting mixture was then added 248 parts of concentrated sulfuric 96% acid in 125 parts of water, keeping the temperature below 50 degrees C. After standing for 17 hours the product was crushed, dried at 70 degrees C. for four hours, screened 20/60 mesh, washed free of excess acid, and regenerated by treating with 4% sodium carbonate solution. The capacity of this product under conditions of flow through a column packed with the material was 30,000 grains (in terms of $CaCO_3$) per cubic foot.

*Example III*

The resinous condensation product obtained by reacting 80 parts of an aliphatic amine mixture (50% diethylenetriamine, 25% triethylenetetramine and 25% tetraethylenepentamine) with 125 parts of 37% by weight aqueous formaldehyde solution was redissolved with 125 parts of 37% by weight aqueous formaldehyde solution, followed by the addition of 80 parts of phenol. To this mixture was then gradually added 304 parts of 61.6% by weight sulfuric acid.

The tough solid which resulted was allowed to stand overnight, crushed, dried at 70 degrees C. for twelve hours, screened 20/60 mesh, washed, and regenerated.

The resulting product had good physical properties and a capacity of 40,000 grains per cubic foot.

*Example IV*

The resin obtained by reacting 66 parts of 69% ethylene diamine solution with 108 parts of 37% by weight aqueous formaldehyde solution was dissolved with 108 parts of 37% by weight aqueous formaldehyde, 94 parts of phenol aded, and the mixture caused to react by the addition of 440 parts of 20.1% hydrochloric acid solution while keeping the temperature below 50 degrees C., and then heated until a firm solid formed. The solid was then crushed, dried at 80 degrees C. for five and one-half hours, screened 20/60 mesh, washed and regenerated.

The resulting product had a capacity of 24,000 grains per cubic foot.

*Example V*

An insoluble resinous material was obtained as follows: The resin obtained by the reaction of 320 parts of tetraethylenepentamine with 400 parts of 37% by weight aqueous formaldehyde solution was dissolved into 450 parts of 37% by weight aqueous formaldehyde solution. To this solution was added slowly, and while keeping the temperature below 40 degrees C., 550 parts of resorcinol dissolved in 500 parts of water. A light yellow mass was thus obtained. This became darker and harder when heated with 1976 parts of an aqueous solution containing 830 parts of concentrated sulfuric acid.

*Example VI*

The resinous product obtained by reacting 255 parts of furfural with 63 parts of tetraethylenepentamine was made to react with 127 parts of phenol. This was then treated with 243.2 parts of 61.6% sulfuric acid solution. On heating, a gelatinous black mass resulted, which hardened upon further heating. When the product was dried at 60–70 degrees C. for 4 hours, a hard material resulted. It was found to have good ion exchange properties.

To compare the products of the invention with other types of anion exchange products, to illustrate the advantages of the invention and to demonstrate that entirely different results are obtained by an acidic condensation as carried out in accordance with the present invention in contrast to a basic condensation, the product of Example I was compared with a product made in the following manner, hereinafter referred to as sample X.

To one and one-half mols of formaldehyde in the form of 37% by weight aqueous formaldehyde solution and one-half mol of phenol was added one-half mol of triethylenetetramine with cooling and at such a rate that the temperature was maintained below 30 degrees C. Upon completion of the amine addition, a yellow gel formed which was dried on the steam bath for one and one-half hours. The initial gel melted and then hardened on the steam bath. The resin was dried at 125 degrees C. for sixteen hours and the resultant yellow, hard material was ground and screened.

A comparison of the stability of the two basic exchange resins was obtained as follows: The samples were screened through a 16 mesh screen to a 60 mesh screen and regenerated with 4% sodium carbonate solution. The excess sodium carbonate solution was washed from the resin particles and 25 ml. of resin taken as a sample quantity. After decanting all excess liquids, 50 cc. of 1% hydrochloric acid was added. The suspension of resin particles in acid solution was placed on a steam bath for ten minutes, after which the hot acid solution was filtered from the resin particles and transmission readings taken on a "Phototester," as described in the article by F. K. Lindsay and R. G. Bielenberg, Industrial and Engineering Chemistry, volume 12, pages 460–463 (1940). After washing the sample with three 25 ml. portions of distilled water, another 50 ml. of 1% hydrochloric acid solution was added and the above described procedure repeated. The results of three such cycles on the resins were as follows:

Product Example I:

| | Transmission readings, per cent |
|---|---|
| Cycle 1 | 96 |
| 2 | 97 |
| 3 | 98 |

Sample:

| | |
|---|---|
| Cycle 1 | 63 |
| 2 | 66 |
| 3 | 72 |

After the three cycles described above, the resin particles of Example I were hard and resembled the original material. The resin particles from sample X had become soft and gelatinous. The odor of formaldehyde was discernible in the acid solution filtered from sample X and in addition this acid solution was very turbid. The odor of formaldehyde and the turbidity indicate, without question, the decomposition of this resin.

It is believed to be apparent from the foregoing description that the products of this invention have marked and valuable properties of anion adsorption, absorption or exchange. They also exhibit unusual stability in dilute acid, neutral and dilute alkaline solutions, even upon heating to temperatures as high as 150 degrees F. The acidic condensation products of the present invention are therefore entirely different and superior to many other types of resinous condensation products which have been heretofore described. They can be employed, because of their stability, for many anion exchange applications that can not be successfully handled by heretofore known products. The products of the invention are also useful as basic catalysts in various types of catalytic reactions. The process of preparing the products of the invention has the advantage that it goes to completion in a relatively short time without any outside heating, whereas the preparation of many prior art products requires heating for an extended period of time. The use of anion exchangers for the treatment of liquids, in order to remove anions therefrom, is well understood by those skilled in the art. Typical anions which can be removed from liquids in this manner are the sulfate, nitrate, chloride, bromide, acetate and other anions of acids. These anion exchangers may also be used for the treatment of gases or other fluids. The treatment may be performed continuously or intermittently. When the resinous anion exchanger has substantially exhausted its power to remove the anions, it is said to be exhausted and may be revived or regenerated with an alkaline solution such as, for example, sodium carbonate, sodium hydroxide or ammonium hydroxide. The anion exchangers of the present invention are not limited to use with aqueous liquids, but also may be employed to remove acidic constituents from organic solvents, in which they are insoluble, or from emulsions containing a water soluble and a water insoluble phase.

The term "acidic condensation" is used herein to describe a procedure in which sufficient acid is added to make the composition acidic. As will be apparent to those skilled in the art, the mere addition of an acid in amounts insufficient to neutralize the amine would not make the composition acidic.

Having thus described the invention, what we claim as new and desire to secure by Letters Patent of the United States is:

1. A water insoluble anion exchange resin obtained by reacting in an aqueous medium a polyalkylene polyamine and formaldehyde, while maintaining the reactants and products in liquid phase, the formaldehyde being an excess over that required for the reaction and the quantity of water being sufficient to dissolve the resultant condensation product, adding phenol and allowing the ingredients of the resultant reaction mixture to react substantially in liquid phase, acidifying with an aqueous acid solution to a low pH approximating pH 1 to 2 at a rate such that the temperature does not rise to the temperature at which the resultant resin solidifies and in a quantity effective to produce a clear solution of the resultant product, and then causing the resultant product to solidify, the proportions of said reactants corresponding to 0.7 to 1.7 mols of basic nitrogen atoms per 1.5 to 3.0 mols of formaldehyde per mol of phenol, said product when dried having a nitrogen content within the range of 9 to 14% nitrogen, a capacity in excess of 10,000 grains per cubic foot, and which when 25 ml. thereof is regenerated with a 4% sodium carbonate solution, heated on a steam bath with 50 cc. of 1% hydrochloric acid for 10 minutes, filtered and washed with 25 ml. of distilled water will produce a transmission reading of at least 95%.

2. A resinous condensation product obtained by reacting approximately 189 parts of tetraethylenepentamine with 324 parts of 37% by weight aqueous formaldehyde solution, dissolving the resultant product in 324 parts of 37% by weight aqueous formaldehyde solution, allowing the product to stand until a clear solution is obtained, adding 386 parts of phenol, allowing the resultant mixture to react for 15 minutes, adding about 912 parts of 61.6% by weight sulfuric acid solution at such a rate that the temperature does not exceed 50 degrees C., allowing the resultant product to stand and the temperature to rise until the product polymerizes to a hard solid, crushing the resultant product, drying said product at 70 degrees C., screening, washing with water until the effluent is near neutral and subjecting the product to an alkaline regeneration.

3. A process of treating fluids and removing an acid forming constituent therefrom which comprises contacting a fluid containing an acid forming constituent with an alkali regenerated water insoluble anion exchange resin obtained by reacting in an aqueous medium a polyalkylene polyamine and formaldehyde, while maintaining the reactants and products in liquid phase, the formaldehyde being an excess over that required for the reaction and the quantity of water being sufficient to dissolve the resultant condensation product, adding phenol and allowing the ingredients of the resultant reaction mixture to react substantially in liquid phase, acidifying with an aqueous acid solution to a pH around pH 1 to 2 at a rate such that the temperature does not rise to the temperature at which the resultant resin solidifies and in a quantity effective to produce a clear solution of the resultant product, and then allowing the resultant product to solidify, the proportions of said reactants corresponding to 0.7 to 1.7 mols of basic nitrogen atoms per 1.5 to 3.0 mols of formaldehyde per mol of phenol, said product when dried having a nitrogen content within the range of 9 to 14% nitrogen, a capacity in excess of 10,000 grains per cubic foot, and which when 25 ml. thereof is regenerated with a 4% sodium carbonate solution, heated on a steam bath with 50 cc. of 1% hydrochloric acid for 10 minutes, filtered and washed with 25 ml. of distilled water will produce a transmission reading of at least 95%.

4. A process of treating fluids and removing an acid forming constituent therefrom which comprises contacting a fluid containing an acid forming constituent with an alkali regenerated resinous condensation product obtained by reacting approximately 189 parts of tetraethylenepentamine with 324 parts of 37% by weight aqueous formaldehyde solution, dissolving the resultant product in 324 parts of 37% by weight aqueous formaldehyde solution, allowing the product to stand until a clear solution is obtained, adding 386 parts of phenol, allowing the resultant mixture to react for 15 minutes, adding about 912 parts of 61.6% by weight sulfuric acid solution at such a rate that the temperature does not exceed 50 degrees C., allowing the resultant product to stand and the temperature to rise until the product polymerizes to a hard solid, crushing the resultant product, drying said product at 70 degrees C., screening, washing with water until the effluent is near neutral and subjecting the product to an alkaline regeneration.

5. A water insoluble anion exchange resin obtained by reacting in an aqueous medium a polyalkylene polyamine and formaldehyde, while maintaining the reactants and products in liquid phase, the formaldehyde being an excess over that required for the reaction and the quantity of water being sufficient to dissolve the resultant condensation product, adding phenol and allowing the ingredients of the resultant reaction mixture to react substantially in liquid phase, acidifying with an aqueous acid solution to a pH around pH 1 to 2 at a rate such that the temperature does not rise to the temperature at which the resultant resin solidifies and in a quantity effective to produce a clear solution of the resultant product, and then allowing the resultant product to solidify, crushing the solidified product and regenerating the resultant product with an alkali, the proportions of said reactants corresponding to 0.7 to 1.7 mols of basic nitrogen atoms per 1.5 to 3.0 mols of formaldehyde per mol of phenol, said product when dried having a nitrogen content within the range of 9 to 14% nitrogen, a capacity in excess of 10,000 grains per cubic foot, and which when 25 ml. thereof is regenerated with a 4% sodium carbonate solution, heated on a steam bath with 50 cc. of 1% hydrochloric acid for 10 minutes, filtered and washed with 25 ml. of distilled water will produce a transmission reading of at least 95%.

6. A water insoluble anion exchange resin obtained by reacting in an aqueous medium an alkylene polyamine and an aldehyde from the group consisting of formaldehyde and furfural, while maintaining the reactants and products in liquid phase, said aldehyde being an excess over that required for the reaction and the quantity of water being sufficient to dissolve the resultant condensation product, adding phenol and allowing the ingredients of the resultant reaction mixture to react while maintaining a temperature below 50° C., acidifying the resultant mixture with an aqueous acid solution to a low pH approximating pH 1 to 2 at a rate such that the temperature does not rise to the temperature at which the resultant resin solidifies and in a quantity effective to produce a clear solution of the resultant product and then causing the resultant product to solidify, the proportions of said reactants corresponding to 0.7 to 1.7 mols of basic nitrogen per 1.5 to 3.0 mols of formaldehyde per mol of phenol, said product when dried having a nitrogen content within the range of 9 to 14% nitrogen, a capacity in excess of 10,000 grains per cubic foot, and which when 25 ml. thereof is regenerated with a 4% sodium carbonate solution, heated on a steam bath with 50 cc. of 1% hydrochloric acid for 10 minutes, filtered and washed with 25 ml. of distilled water will produce a transmission reading of at least 95%.

7. A process of treating fluids and removing an acid forming constituent therefrom which comprises reacting a fluid containing an acid forming constituent with an alkali regenerated water insoluble anion exchange resin as claimed in claim 6.

8. A resinous condensation product obtained by reacting 94 parts of tetraethylenepentamine with 150 parts of 37% by weight aqueous formaldehyde solution, dissolving the resultant product in 100 parts of 37% by weight aqueous formaldehyde solution, adding 176 parts of phenol, adding to the resultant mixture 248 parts of concentrated 96% sulfuric acid in 125 parts of water while keeping the temperature below 50° C., and allowing the resultant product to stand and the temperature to rise until a hard solid is obtained.

9. A resinous condensation product obtained by reacting 66 parts of 69% by weight ethylene diamine solution with 108 parts of 37% by weight aqueous formaldehyde solution, dissolving the resultant product in 108 parts of 37% by weight aqueous formaldehyde solution, adding 94 parts of phenol, adding 440 parts of 20.1% by weight hydrochloric acid solution while keeping the temperature below 50° C. and then heating until a firm solid is formed.

10. A resinous condensation product obtained by reacting 255 parts of furfural with 63 parts of tetraethylenepentamine, reacting the resultant product with 127 parts of phenol, treating the resultant mixture with 243.2 parts of 61.6% by weight sulfuric acid while maintaining a temperature below 50° C., heating the resultant reaction mixture until a gelatinous black mass forms which hardens upon further heating, and drying the resultant product.

DAVID G. BRAITHWAITE.
JOSEPH S. D'AMICO.

REFERENCES CITED

The following references are of record in the file of this patent:

UNITED STATES PATENTS

| Number | Name | Date |
|---|---|---|
| 2,098,869 | Harmon et al. | Nov. 9, 1937 |
| 2,388,235 | Bowman | Nov. 6, 1945 |
| 2,402,384 | Eastes | June 18, 1946 |